(12) United States Patent
Chen

(10) Patent No.: US 7,920,728 B2
(45) Date of Patent: Apr. 5, 2011

(54) APPARATUS AND METHOD FOR FINGERPRINT RECOGNITION

(75) Inventor: Hui Hsuan Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 1049 days.

(21) Appl. No.: 11/689,411

(22) Filed: Mar. 21, 2007

(65) Prior Publication Data

US 2007/0269084 A1 Nov. 22, 2007

(30) Foreign Application Priority Data

May 19, 2006 (TW) .............................. 95117801 A

(51) Int. Cl.
*G06K 9/00* (2006.01)
(52) U.S. Cl. ........................................ 382/124; 382/115
(58) Field of Classification Search .................. 382/124, 382/127, 126, 125, 115, 116, 100, 181, 141, 382/145, 190, 195, 205, 148, 172, 168, 152, 382/149; 250/227.11, 250, 200, 216, 206, 250/555, 556, 306, 310, 311, 559.42; 427/1; 356/237.1, 237.2, 601, 613; 430/504, 903, 430/111.41, 505, 957, 544, 359, 212, 523, 430/904, 122.51, 506, 84, 379, 567; 348/126, 348/128, 616; 702/189; D14/384, 300, 356, D14/383
See application file for complete search history.

(56) References Cited

U.S. PATENT DOCUMENTS

| | | | | |
|---|---|---|---|---|
| 3,743,421 A | * | 7/1973 | Maloney | 356/71 |
| 5,548,394 A | * | 8/1996 | Giles et al. | 356/71 |
| 5,726,443 A | * | 3/1998 | Immega et al. | 250/227.2 |
| 5,892,599 A | | 4/1999 | Bahuguna | |
| 6,061,463 A | * | 5/2000 | Metz et al. | 382/124 |
| 6,122,394 A | * | 9/2000 | Neukermans et al. | 382/124 |
| 6,154,285 A | * | 11/2000 | Teng et al. | 356/445 |
| 6,665,427 B1 | * | 12/2003 | Keagy et al. | 382/124 |

FOREIGN PATENT DOCUMENTS

JP 2-133892 A 5/1990

\* cited by examiner

*Primary Examiner* — Kanji Patel

(57) ABSTRACT

An apparatus and method for fingerprint recognition comprises a light source, an optical component, an imaging device and a processor. The light source directs a monochromatic light through the optical component and then forms a plurality of interference fringes on a fingerprint desired to be recognized; the imaging device receives an optical image signal of the interference fringes reflected from the fingerprint and transfers it to an electrical image signal; the processor creates a contour image of the fingerprint according to the electrical image signal for post-recognition.

32 Claims, 3 Drawing Sheets

APPARATUS AND METHOD FOR FINGERPRINT RECOGNITION

CROSS REFERENCE TO RELATED APPLICATION

This application claims the priority benefit of Taiwan Patent Application Serial Number 095117801, filed on May 19, 2006, the full disclosure of which is incorporated herein by reference.

BACKGROUND OF THE INVENTION

1. Field of the Invention

This invention generally relates to an apparatus and method for image recognition, and more particularly to an apparatus and method for fingerprint recognition which projects interference fringes on a fingerprint to create a corresponding contour image thereof for image recognition.

2. Description of the Related Art

Conventional apparatus and method for fingerprint recognition is disclosed in U.S. Pat. No. 5,723,148 and shown in FIG. 1, entitled "Apparatus and method for electrically acquiring fingerprint images with low cost removable platen and separate image device". The apparatus includes a housing 18 having an imaging aperture; a light source 22 for directing light 28 toward the imaging aperture; an imaging device 30 for receiving light reflected from a fingertip or other portion of a body visible through the imaging aperture and electronically sensing the image in the reflected light; and a low cost, easily replaceable, disposable platen 8 disposed in the imaging platen aperture and having a generally flat, thin configuration and having a first surface 26 upon which a portion of a body such as a fingertip is placed when the platen is in use and a second surface 12 which is generally parallel to the first surface 26 and which includes a plurality of projections comprising an optical structure, the projections being small enough to maintain the generally flat, thin configuration of the disposable platen 8 and comprised of material through which light can pass the plurality of projections of the optical structure having optical characteristics to prevent light rays originating at the light source 22 arriving at the second surface 12 from being reflected off the second surface 12 toward the imaging device 30 but instead causing the light rays 28 to enter the disposable platen 8 and travel through the disposable platen 8 so as to reach the first surface 26 without the need for guiding with the platen by total reflection, the configuration of the projections being such that most light rays refracted toward the second surface 12 from portions of the first surface 26 not in contact with flesh exit the first surface 26 and travel generally toward the imaging device 30, as shown in FIG. 3 of U.S. Pat. No. 5,723,148. In practical use, the fingerprint acquiring apparatus utilizes a cheap, replaceable and disposable platen so as to decrease the time and cost for maintaining the platen 8. However, since every individual has different distance interval between ridges of his fingerprint, the projections on the platen 8 of the second surface 12 have to be disposed differently in accordance with different individuals in order to improve the resolution of the acquired fingerprint image. Therefore, the apparatus still has the problem of high manufacturing complexity for the platen 8.

Accordingly, there is still a need to improve the structure of the fingerprint image acquiring apparatus in the art so as to increase the image quality of an acquired fingerprint image with minimized recognition apparatus.

SUMMARY OF THE INVENTION

It is an object of the present invention to provide an apparatus and method for fingerprint recognition, which projects a plurality of interference fringes on a fingerprint desired to be recognized and then utilizes the optical path difference caused by the height differences between ridges and valleys of the fingerprint to create a contour image of the fingerprint so as to improve the resolution of the acquired fingerprint image.

It is another object of the present invention to provide an apparatus and method for fingerprint recognition, which projects a plurality of interference fringes on a fingerprint desired to be recognized and then utilizes the optical path difference caused by the height differences between ridges and valleys of the fingerprint to create a contour image of the fingerprint so as to minimize the size of the recognition apparatus.

It is a further object of the present invention to provide an apparatus and method for fingerprint recognition, which projects a plurality of interference fringes on a fingerprint desired to be recognized and utilizes the optical path difference caused by the height differences between ridges and valleys of the fingerprint to create a contour image of the fingerprint so as to increase the difficulty for counterfeiting fingerprint data.

In order to achieve above objects, a fingerprint recognition apparatus according to the present invention mainly comprises a light source, an optical component, a transparent member and an imaging device. The light source generates a monochromatic light; the optical component has a first surface and a second surface, wherein the monochromatic light enters the optical component through the first surface and exits from the second surface; and the transparent member has a first, a second and a third optical surfaces, wherein the second surface of the optical component adjoins to the first optical surface and the second optical surface comprises a platen area for receiving a fingerprint; and the imaging device is disposed outside the third optical surface and transferring an optical image signal to an electrical image signal; wherein the monochromatic light enters the transparent member through the optical component adjacent to the first optical surface and forms a plurality of interference fringes on the platen area of the second optical surface which reflects an optical image signal of the interference fringes to exit the transparent member from the third optical surface and the imaging device receives the optical image signal of the interference fringes.

The present invention further provides a fingerprint recognition method comprising the steps of: providing a light source for generating a monochromatic light; providing an optical component disposed in the optical path of the monochromatic light, wherein the optical component has a first surface and a second surface and the monochromatic light enters the optical component through the first surface and exits from the second surface; providing a platen area for fingerprint pressing and utilizing the monochromatic light to form a plurality of interference fringes on the platen area after the monochromatic light exiting from the second surface of the optical component; and providing an imaging device for receiving an optical image signal of the interference fringes reflected from the platen area and transferring the optical image signal of the interference fringes to an electrical image signal.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE PREFERRED EMBODIMENT

Figure 2A:
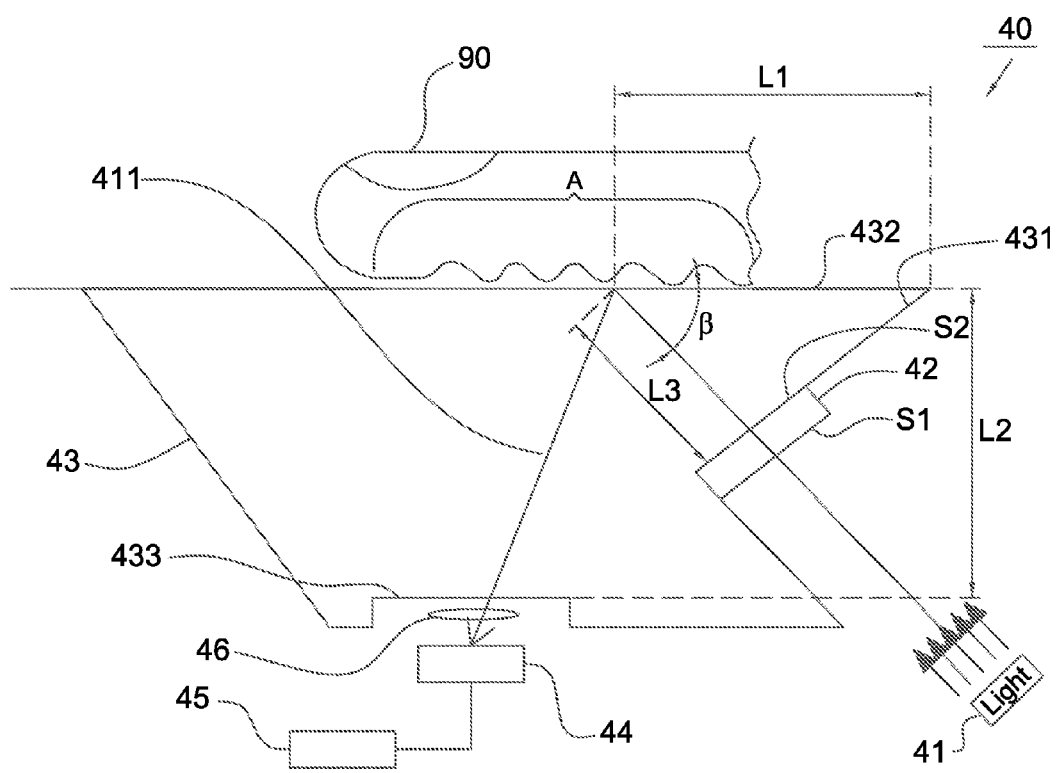
FIG. 2a shows a schematic view of a fingerprint recognition apparatus according to one embodiment of the present invention.
Figure 2B:
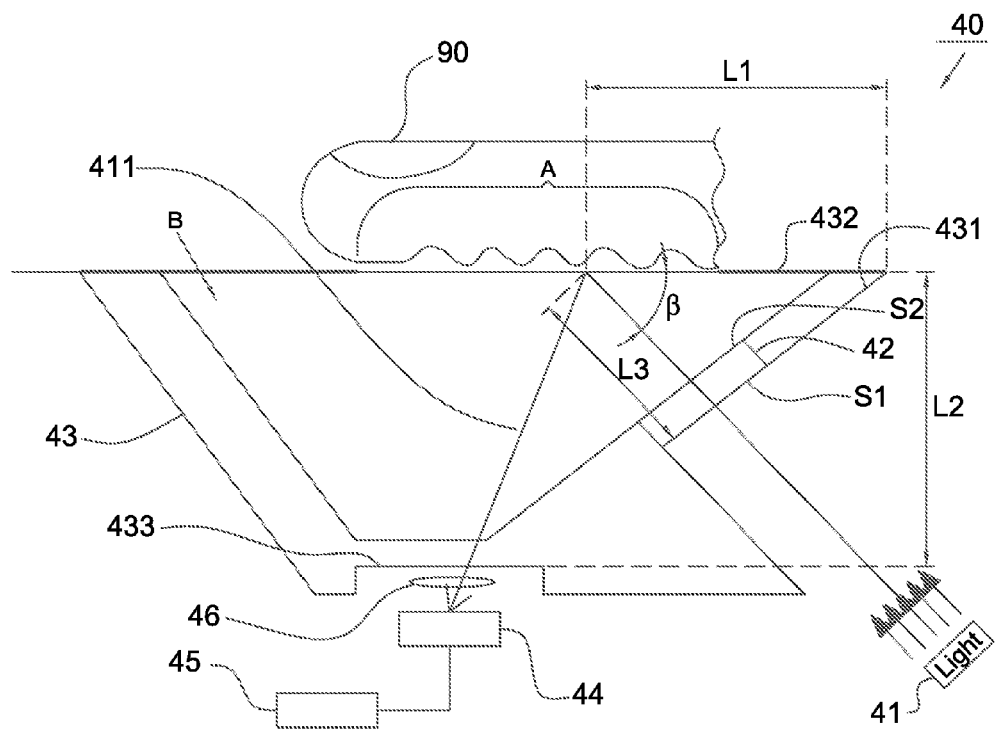
FIG. 2b shows another schematic view of a fingerprint recognition apparatus according to one embodiment of the present invention, wherein the optical component is integrated on the first optical surface of the transparent member.

Referring to FIGS. 2a and 2b, there are shown the apparatus and method according to one embodiment of the present invention. The fingerprint recognition apparatus 40 includes a light source 41, an optical component 42, a transparent member 43, an imaging device 44, a processor 45 and a lens 46. In this invention, the light source 41 is utilized to project a plurality of interference fringes on a fingerprint of a fingertip 90 and an optical image signal of the interference fringes is reflected from the fingerprint. The imaging device 44 receives the optical image signal and transfers it to an electrical image signal. The processor 45 receives the electrical image signal and creates a contour image of the fingerprint according to the optical path difference caused by the height differences between ridges and valleys of the fingerprint. The contour image is utilized for comparing with the existing fingerprint images stored in a database.

Figure 3:
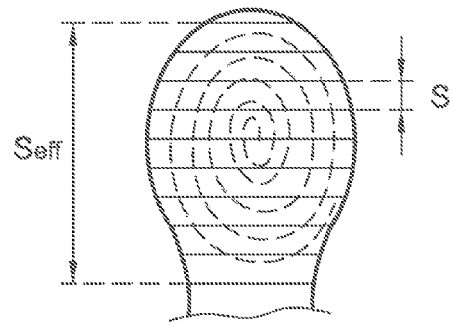
FIG. 3 shows a schematic view of interference fringes projected on a fingerprint desired to be recognized by means of the fingerprint recognition apparatus and method according to the embodiment of the present invention.

Referring to FIGS. 2a, 2b and 3, there are shown the light source 41 according to one embodiment of the present invention. In order to form the interference fringes on the fingerprint, preferably, the light source 41 is a monochromatic light source. The light source 41 may be a coherent light source, e.g. a laser diode, or an incoherent light source, e.g. light emitting diode (LED).

The optical component 42 is disposed in the optical path of the monochromatic light and has a first surface $S_1$ and a second surface $S_2$. The monochromatic light enters the optical component 42 through the first surface $S_1$ and exits from the second surface $S_2$. The monochromatic light forms a plurality of interference fringes on a fingerprint desired to be recognized after propagating through the optical component 42, as shown in FIG. 3. The optical component 42 may be a grating, a bi-prism or composed of a single-slit and a double-slit wherein the single-slit is formed on the first surface $S_1$ and the double-slit is formed on the second surface $S_2$ of the optical component 42.

The transparent member 43 has a first optical surface 431, a second optical surface 432 and a third optical surface 433. The second surface $S_2$ of the optical component 42 adjoins to outside of the first optical surface 431 and the second optical surface 432 has a platen area "A" for receiving the fingerprint of the fingertip 90 pressed thereon which is desired to be recognized. The third optical surface 433 is an exiting surface of the reflected optical image of the interference fringes from the fingerprint. In one embodiment, according to different applications, the optical component 42 may be integrated on the first optical surface 431 of the transparent member 43, as shown in FIG. 2b. In one embodiment, the transparent member 43 may be manufactured as transparent member having a hollow space "B" therein.

The imaging device 44 may be a linear sensor or an array sensor, and it is disposed outside of the third optical surface 433 of the transparent member 43. The imaging device 44 is utilized for sensing an optical image signal reflected from the interference fringes projected on a fingerprint which is desired to be recognized or acquired and transfers the optical image signal of the interference fringes to an electrical image signal in which containing the information of the fingerprint marked by the interference fringes. In one embodiment, the lens 46 is disposed between the imaging device 44 and the third optical surface 433 so as to increase the sensing efficiency of the imaging device 44.

The processor 45 is electrically connected to the imaging device 44 and can create a contour image of the fingerprint desired to be recognized or acquired according to the electrical image signal sent from the imaging device 44. In this embodiment, the method to create the contour image from the electrical image signal containing the information of the fingerprint marked by the interference fringes is to use the conventional Moiré Topography.

Referring to FIGS. 2a, 2d and 3 again, during fingerprint recognition procedure by utilizing the fingerprint recognition apparatus 40 according to the embodiment of the present invention, a fingertip 90 desired to be recognized is placed on the platen area "A" on the second optical surface 432 of the transparent member 43 and its fingerprint is accordingly pressed on the platen area "A". Then the light source 41 directs the monochromatic light toward the platen area "A". For illustration purpose, only one light ray 411 is shown to represent the light directed by the light source 41 and in practical a significant number of light rays should be directed by the light source 41 to the second optical surface 432. The light ray 411 enters the optical component 42 through its first surface $S_1$ and exits from its second surface $S_2$, and then the light ray 411 enters the transparent member 43 through its first optical surface 431 and forms a plurality of interference fringes on the platen area "A" of the second optical surface 432 of the transparent member 43, as shown in FIG. 3, wherein S denotes a distance between two adjacent interference fringes and $S_{eff}$ denotes the width of an effective interfering area that the interference fringes can effectively form on the platen area "A". Generally, the distances between adjacent ridges of a fingerprint are about 400 to 700 micrometers, and the distance S between two adjacent of the interference fringes are preferably smaller than 350 micrometers so as to form enough number of interference fringes on the fingerprint thereby marking a contour of the fingerprint. An angle beta ($\beta$) between the incident direction of the light rays 411 and the second optical surface 432 is preferably between 5 and 85 degree so as to form the interference fringes effectively and the interference fringes projected on the second optical surface 432 are parallel to the normal of the plane of incident of the light ray 411. An optical image signal (still shown as 411) of the interference fringes then will be reflected from the second optical surface 432 and exits the transparent member 433 from the third optical surface 433. Since the optical image signal exiting the transparent member 43 from its third optical surface 433 contains the information of the fingerprint of the fingertip 90, the imaging device 44 receives the optical image signal of the interference fringes through the lens 46 and transfers the optical image signal to an electrical image signal which contains the information of the fingerprint marked by the interference fringes. Finally, the processor 45 receives the electrical image signal from the imaging device 44, creates a contour image of the fingerprint desired to be recognized by the Moiré Topography and compares the contour image with existing fingerprint images in a database.

Referring to FIGS. 2a, 2b and 3 again, three options can be utilized to project a plurality of interference fringes on the second optical surface 432 of the transparent member 43. In one approach, the light source 41 generates coherent light while the optical component 42 is a grating, and the cycle of the grating is expressed in equation (1):

$$\text{cycle of grating} = \frac{\text{wavelength}}{\sin\left[\tan^{-1}\left(\frac{\text{width of interference fringes}}{2 \times L_1 \cos \beta}\right)\right]} \quad (1)$$

where the wavelength denotes a wavelength of the coherent light; $L_3$ denotes a projection distance of the interference fringes, i.e. a perpendicular distance from the second surface $S_2$ of the optical component 42 to the second optical surface 432 of the transparent member 42 and $L_3 = L_1 \cos \theta$; $\beta$ denotes an angle between the incident direction of the light ray 411 and the second optical surface 432. In this embodiment, if the wavelength is 650 nm and $L_3$ is 5000 micrometers, the cycle of the grating has to be larger than 32 micrometers such that the distance between two adjacent interference fringes S is able to be smaller than 350 micrometers thereby forming enough number of the interference fringes on the fingerprint for marking the contour thereof.

In another approach to form the interference fringes, the light source 41 may generate coherent light or incoherent light and the optical component 42 is a bi-prism. A width of the bi-prism is expressed in equation (2):

$$\text{width of bi-prism} = \frac{L_1 \cos \beta \times \text{wavelength}}{\text{width of interference fringes}} \quad (2)$$

where the wavelength denotes the central wavelength of the coherent light or the incoherent light; $L_3$ denotes a projection distance of the interference fringes and $L_3 = L_1 \cos \theta$; $\beta$ denotes an angle between the incident direction of the light ray 411 and the second optical surface 432. Wherein the interference fringes have an effective interference area $S_{\textit{eff}}$ as shown in FIG. 3, which has to be 3 times larger than the distance between two adjacent interference fringes S such that the distance between two adjacent interference fringes S is able to be smaller that 350 micrometers thereby forming enough number of the interference fringes on the fingerprint for marking the contour thereof.

In another approach to form the interference fringes, the light source 41 may generate coherent light or incoherent light and the optical component 42 is composed of a single-slit and a double-slit wherein the single-slit is formed on the first surface $S_1$ and the double-slit is formed on the second surface $S_2$ of the optical component 42. A distance between the double-slit is expressed in equation (3):

$$\text{distance between double-slit} = \frac{L_1 \cos \beta \times \text{wavelength}}{\text{width of interference fringes}} \quad (3)$$

where the wavelength denotes the central wavelength of the coherent light or the incoherent light; $L_3$ is a projection distance of the interference fringes and $L_3 = L_1 \cos \theta$; $\beta$ denotes an angle between the incident direction of the light ray 411 and the second optical surface 432. In this embodiment, if the central wavelength of the monochromatic light is 650 nm and the projection distance is 7000 micrometers, the distance between the double-slit has to be larger than 22.75 micrometers such that the distance between two adjacent interference fringes S is able to be smaller that 350 micrometers thereby forming enough number of the interference fringes on the fingerprint for marking the contour thereof. In one embodiment, if it is desired to miniaturize the fingerprint recognition apparatus 40, $L_1$ can be selected between 2 and 45 mm; $L_2$ can be selected between 0.5 and 45 mm; $\beta$ can be selected between 5 and 85 degrees.

Figure 1:
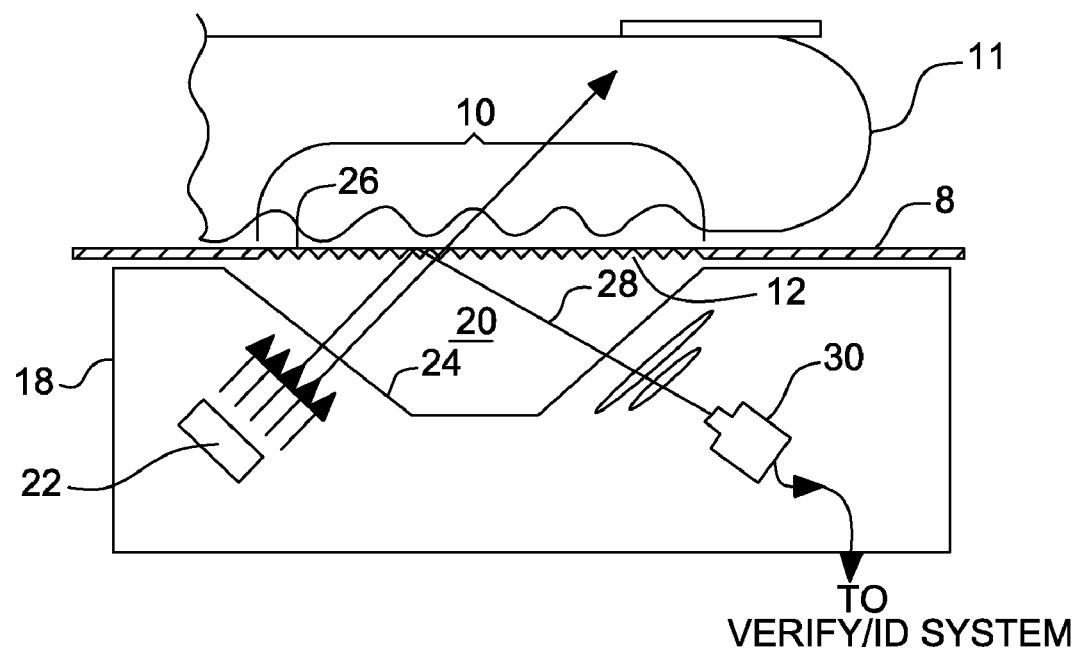
FIG. 1 shows a schematic view of a conventional fingerprint acquiring apparatus.

As shown above, the conventional fingerprint acquiring apparatus, as shown in FIG. 1, has the problem of difficulty to match the projections manufactured on the second surface of the platen region with ridge distances of the fingerprint of every individual, hence the manufacturing complexity is increased. As compared with the conventional one shown in FIG. 1, the fingerprint recognition apparatus of the present invention, as shown in FIG. 2, further provides a fingerprint recognition apparatus with high image resolution, in which by projecting a plurality of interference fringes on a fingerprint desired to be recognized in combination of computer calculation, a contour image of the fingerprint can be created according to optical path differences caused by different height of ridges and valleys of the fingerprint. The contour image can be utilized to compare with existing fingerprints in a database and the size of the fingerprint recognition apparatus also can be minimized. In addition, since the contour image created by the fingerprint recognition apparatus of the present invention can not be imitated on slides or papers by copying machine and only can be counterfeited by creating an identical 3-D contour image, the counterfeiting difficulty of the acquired fingerprint is increased so as to increase the data safety thereof.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A fingerprint recognition apparatus, comprising:
   a light source for generating a monochromatic light;
   an optical component having a first surface and a second surface, configured to receive the monochromatic light entering the optical component through the first surface and exiting from the second surface;
   a transparent member having a first, a second and a third optical surfaces, wherein the second surface of the optical component adjoins to the first optical surface and the second optical surface comprises a platen area for receiving a fingerprint pressed thereon; and
   an imaging device disposed outside the third optical surface for transferring an optical image signal to an electrical image signal;
   wherein the transparent member is configured to receive the monochromatic light through the optical component adjacent to the first optical surface, whereby the monochromatic light forms a plurality of interference fringes on the platen area of the second optical surface, the platen area for reflecting an optical image signal of the interference fringes to exit the transparent member from the third optical surface; and
   wherein the imaging device is configured to receive the optical image signal of the interference fringes.

2. The fingerprint recognition apparatus as claimed in claim 1, wherein a distance between two adjacent interference fringes projected onto the second optical surface is less than 350 micrometers so as to form sufficient number of the interference fringes for marking the fingerprint.

3. The fingerprint recognition apparatus as claimed in claim 2, wherein the monochromatic light is coherent light while the optical component is a grating.

4. The fingerprint recognition apparatus as claimed in claim 2, wherein the optical component is a bi-prism.

5. The fingerprint recognition apparatus as claimed in claim 4, wherein the interference fringes formed on the platen area have an interfering area and the width of the interfering area is approximately 3 times larger than the distance between two adjacent interference fringes.

6. The fingerprint recognition apparatus as claimed in claim 2, wherein the optical component comprises a single-slit and a double-slit; and
the single-slit is formed on the first surface of the optical component and the double-slit is formed on the second surface of the optical component.

7. The fingerprint recognition apparatus as claimed in claim 1, wherein an angle between the incident direction of the monochromatic light and the second optical surface is between 5 and 85 degrees.

8. The fingerprint recognition apparatus as claimed in claim 1,
wherein the light source is configured to generate monochromatic light having a plurality of light rays directed to the second optical surface; and
the interference fringes projected on the second optical surface are parallel to the normal of the plane of incident of the light rays.

9. The fingerprint recognition apparatus as claimed in claim 8, wherein the imaging device is a linear sensor or an array sensor.

10. The fingerprint recognition apparatus as claimed in claim 1, further comprising a processor for receiving the electrical image signal from the imaging device and generating a contour image of the fingerprint according to the electrical image signal.

11. The fingerprint recognition apparatus as claimed in claim 1, further comprising a lens disposed between the imaging device and the third optical surface for increasing a sensing efficiency of the imaging device.

12. The fingerprint recognition apparatus as claimed in claim 1, wherein the optical component is integrated on the first optical surface of the transparent member.

13. A projecting device for projecting a plurality of parallel interference fringes on a fingerprint for fingerprint recognition, comprising:
a light source for generating a monochromatic light;
an optical component having a first surface and a second surface, wherein the monochromatic light is configured to enter the optical component through the first surface and exits from the second surface; and
a platen area for receiving the fingerprint pressed thereon, wherein the projecting device is configured such that the monochromatic light forms a plurality of parallel interference fringes on the platen area after existing from the second surface of the optical component.

14. The projecting device as claimed in claim 13, further comprising:
an imaging device for receiving an optical image signal of the interference fringes reflected from the platen area and for transferring the optical image signal of the interference fringes to an electric image signal; and
a lens disposed in front of the imaging device and in the optical path of the optical image signal of the interference fringes for increasing the sensing efficiency of the imaging device.

15. The projecting device as claimed in claim 13, wherein a distance between two adjacent interference fringes projected onto the platen area is less than 350 micrometers so as to form interference fringes for marking the fingerprint.

16. The projecting device as claimed in claim 15, wherein the monochromatic light is coherent light and the optical component is a grating.

17. The projecting device as claimed in claim 15, wherein the optical component is a bi-prism.

18. The projecting device as claimed in claim 15,
wherein the optical component comprises a single-slit and a double-slit; and
wherein the single-slit is formed on the first surface of the optical component and the double-slit is formed on the second surface of the optical component.

19. The projecting device as claimed in claim 13, wherein an angle between the incident direction of the monochromatic light and the second optical surface is between 5 and 85 degrees.

20. The projecting device as claimed in claim 13, wherein the light source is configured to generate monochromatic light comprising a plurality of light rays directed to the second optical surface from the light source; wherein the interference fringes projected on the second optical surface are parallel to the normal of the plane of incident of the light rays.

21. The projecting device as claimed in claim 20, wherein the imaging device is a linear sensor or an array sensor.

22. The projecting device as claimed in claim 13, further comprising a processor for receiving the electrical image signal from the imaging device and generating a contour image of the fingerprint according to the electrical image signal.

23. A fingerprint recognition method, comprising the steps of:
generating a monochromatic light;
transmitting the monochromatic light through an optical component, wherein the optical component has a first surface and a second surface and the monochromatic light enters the optical component through the first surface and exits from the second surface;
forming a plurality of parallel interference fringes on a fingerprint receiving platen area after the monochromatic light exits from the second surface of the optical component; and
receiving an optical image signal of the plurality of parallel interference fringes reflected from the platen area and transferring the optical image signal of the plurality of parallel interference fringes to an electrical image signal.

24. The fingerprint recognition method as claimed in claim 23, wherein a distance between two adjacent interference fringes projected onto the platen area is less than 350 micrometers so as to form the plurality of parallel interference fringes for marking the fingerprint.

25. The fingerprint recognition method as claimed in claim 24, wherein the monochromatic light is coherent light and the optical component is a grating.

26. The fingerprint recognition method as claimed in claim 24, wherein the optical component is a bi-prism.

27. The fingerprint recognition method as claimed in claim 24,
wherein passing the monochromatic light through the optical component includes passing the monochromatic light through a single-slit and a double-slit; and wherein the single-slit is formed on the first surface of the optical component and the double-slit is formed on the second surface of the optical component.

28. The fingerprint recognition method as claimed in claim 23, wherein an angle between the incident direction of the monochromatic light and the paten area is between 5 and 85 degrees.

29. The fingerprint recognition method as claimed in claim 23,
wherein generating the monochromatic light includes generating a plurality of light rays directed to the second optical surface from the light source; and
the plurality of parallel interference fringes projected on the second optical surface are parallel to the normal of the plane of incident of the light rays.

30. The fingerprint recognition method as claimed in claim 29, wherein the imaging device is a linear sensor or an array sensor.

31. The fingerprint recognition method as claimed in claim 23, further comprising receiving the electrical image signal from the imaging device and generating a contour image of the fingerprint according to the electrical image signal.

32. The fingerprint recognition method as claimed in claim 23, further comprising using a lens disposed in front of the imaging device and in the optical path of the optical image signal of the interference fringes so as to increase the sensing efficiency of the imaging device.

* * * * *